United States Patent [19]

Flores et al.

[11] Patent Number: 5,527,138
[45] Date of Patent: Jun. 18, 1996

[54] SEMI-TRAILER FOR AUTOMOTIVE VEHICLE TRANSPORTATION

[75] Inventors: Ricardo M. G. Flores; Rubens F. A. de Lima, both of São Paulo, Brazil

[73] Assignee: Companhia Transportadora e Comercial Translor, São Bernardo do Campo, Brazil

[21] Appl. No.: 68,711

[22] Filed: May 27, 1993

[30] Foreign Application Priority Data

May 27, 1992 [BR] Brazil .................................... 9202103

[51] Int. Cl.⁶ .................................................. B60P 3/08
[52] U.S. Cl. .................... 410/29.1; 414/537; 414/495; 410/26; 410/24.1; 410/4; 296/181
[58] Field of Search ........................... 414/537, 538, 414/498, 546, 680, 495; 410/3, 4, 7, 8, 14, 15, 19, 24, 24.1, 26, 27, 29.1, 43, 66, 67, 104, 129, 130, 25, 28, 28.1; 296/158, 181

[56] References Cited

U.S. PATENT DOCUMENTS

| | | | |
|---|---|---|---|
| 2,385,115 | 9/1945 | Stuart | 410/26 |
| 2,684,264 | 7/1954 | Demos | 410/24.1 |
| 3,040,917 | 6/1962 | Bonnin | 410/14 X |
| 3,650,416 | 3/1972 | Bodenheimer | 410/29.1 X |
| 3,690,717 | 9/1972 | Taylor | 410/24.1 X |
| 4,759,668 | 7/1988 | Larsen et al. | 410/26 |
| 4,822,222 | 4/1989 | Zeuner et al. | 410/29.1 |
| 5,080,541 | 1/1992 | Andre | 410/24.1 |

FOREIGN PATENT DOCUMENTS

| | | | |
|---|---|---|---|
| 514572 | 6/1954 | Belgium | 410/26 |
| 700201 | 12/1964 | Canada | 410/24.1 |
| 8725 | 1/1981 | Japan | 410/26 |
| 50828 | 5/1981 | Japan | 410/28 |
| 713722 | 2/1980 | U.S.S.R. | 414/495 |

*Primary Examiner*—Frank E. Werner
*Attorney, Agent, or Firm*—Darby & Darby

[57] ABSTRACT

A semi-trailer for automotive vehicle transportation of the type whose front is coupled to a tractor (T) and whose rear rests over at least one wheel train shaft, including a substantially parallelepiped basic structure (10, 110), incorporating a front cargo platform (20, 120), a rear cargo platform (30, 130), and including at least one lower cargo platform (40, 140) and at least one upper cargo platform (50, 150) whose position can be vertically adjusted. The upper longitudinal edges of the basic structure (10, 110) has longitudinal support bars (11, 111) and the corners of the basic structure (10, 110) have front vertical columns (12, 112) and rear vertical columns (13, 113). A remount system (190) is articulately suspended between longitudinal support bars (111) of basic structure (110) by support pendula (192) and articulately attached to the longitudinal support bars (111) by positioning arms (193) in order to be longitudinally and vertically displaceable along basic structure (110).

13 Claims, 17 Drawing Sheets

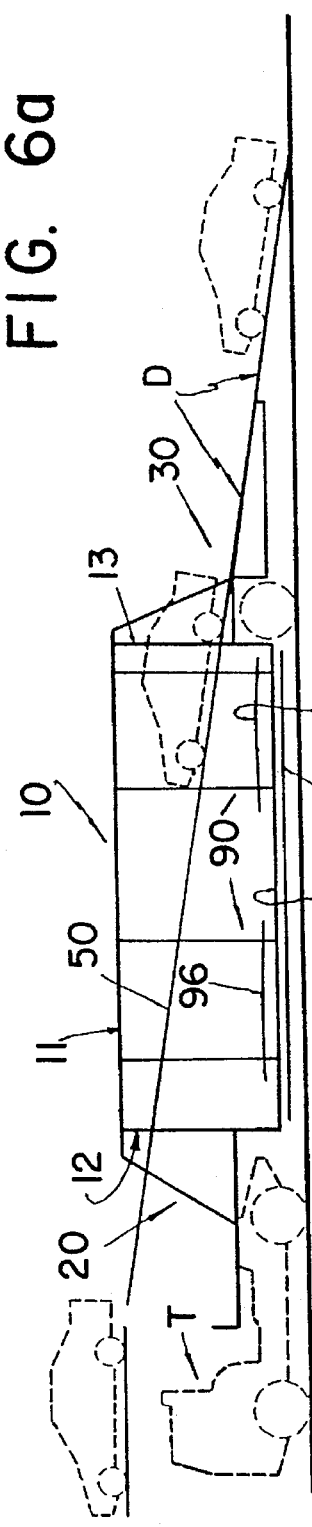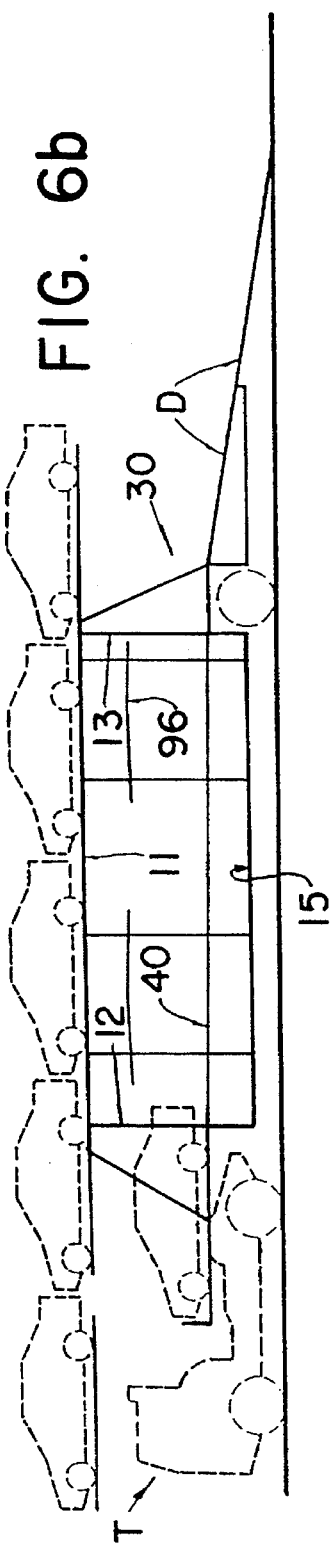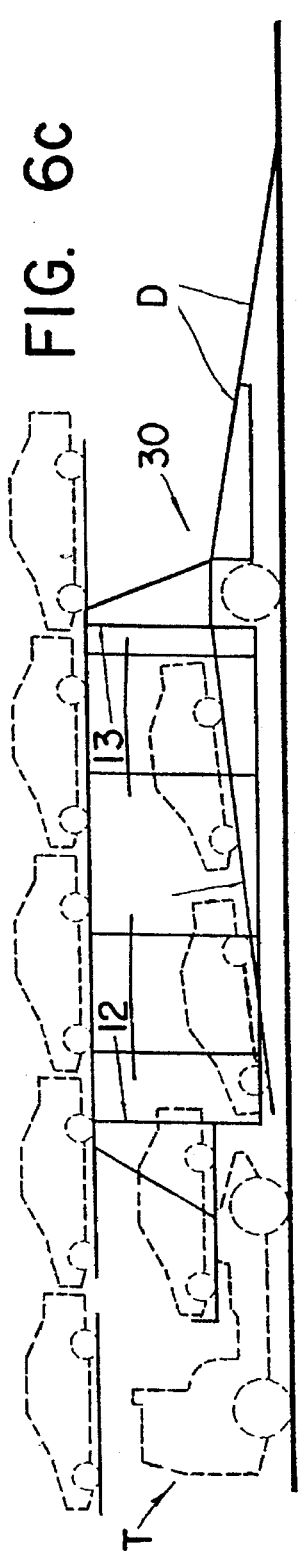

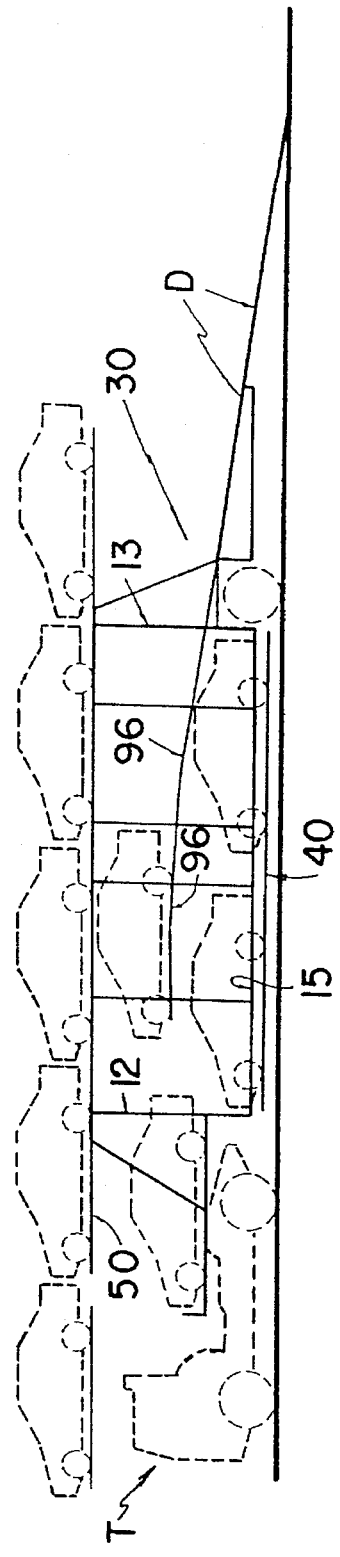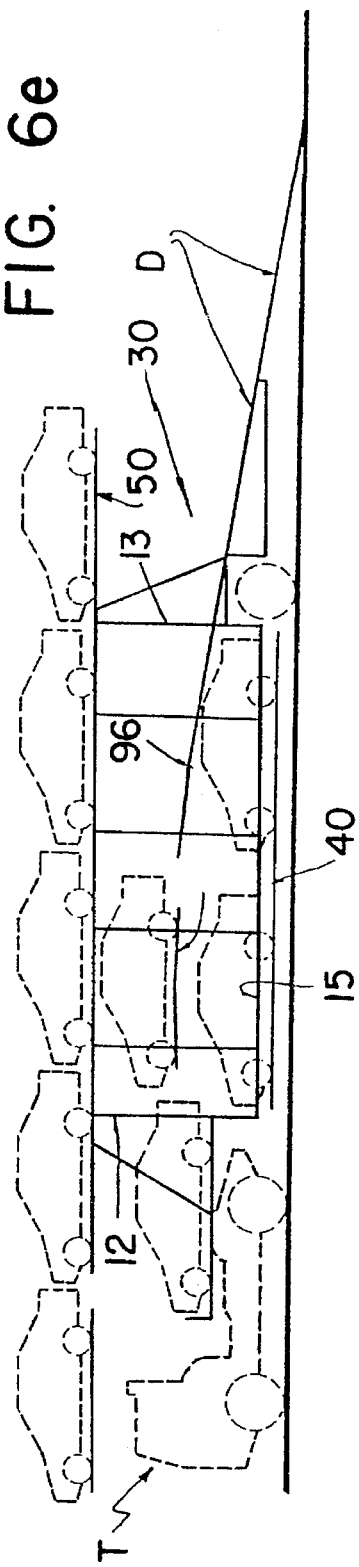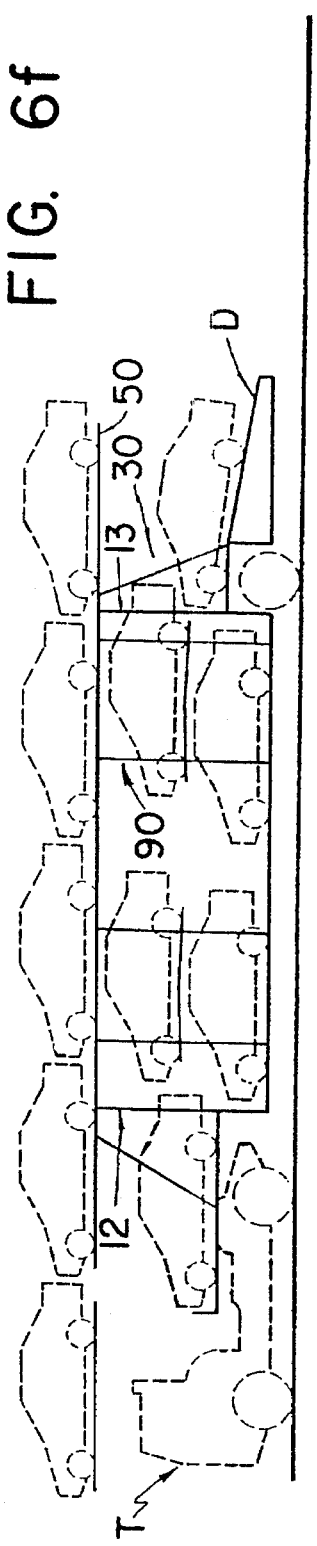

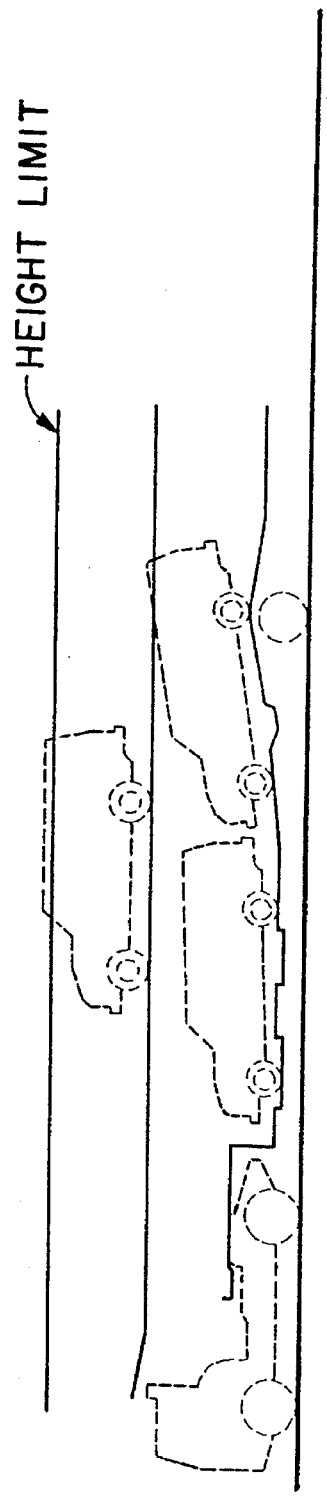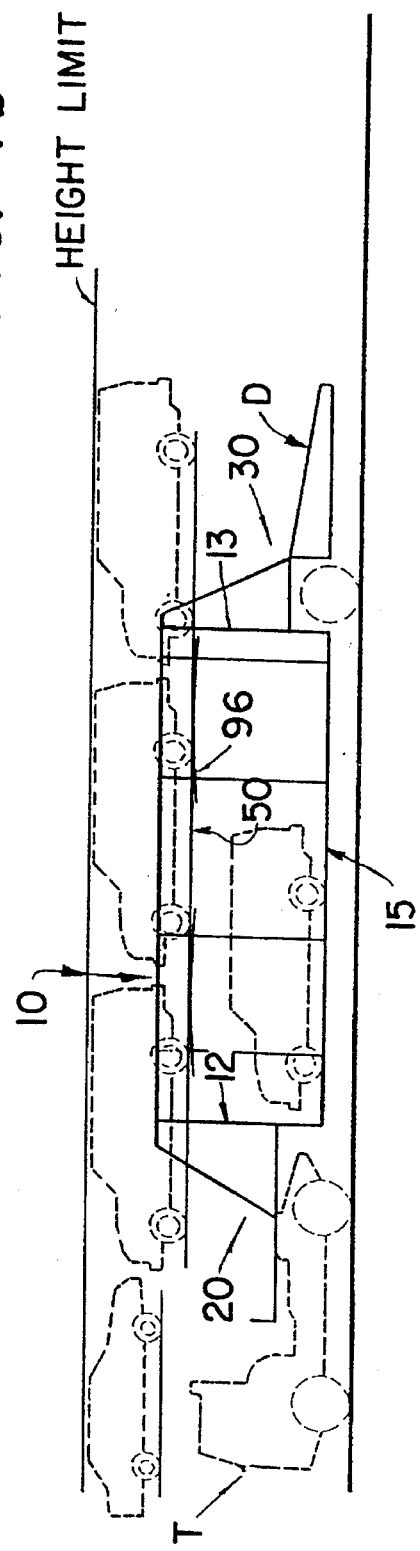

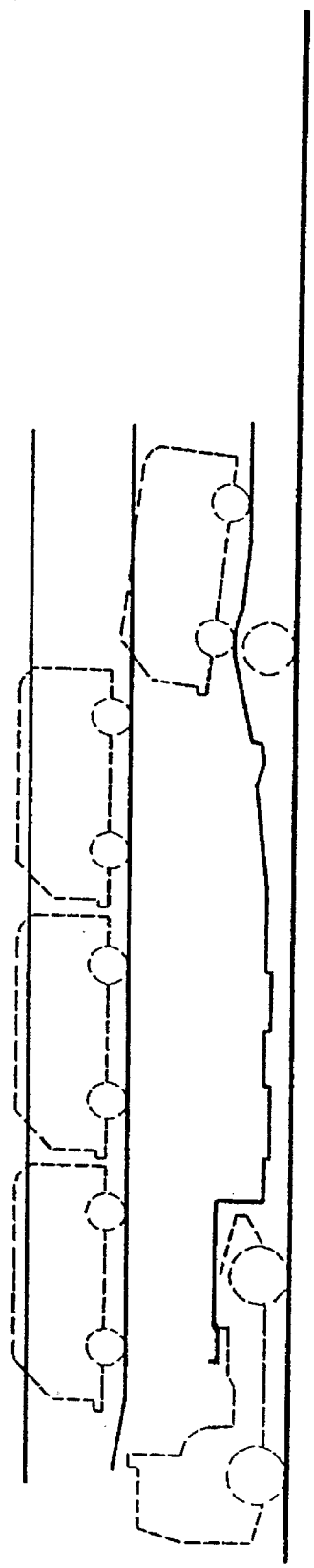
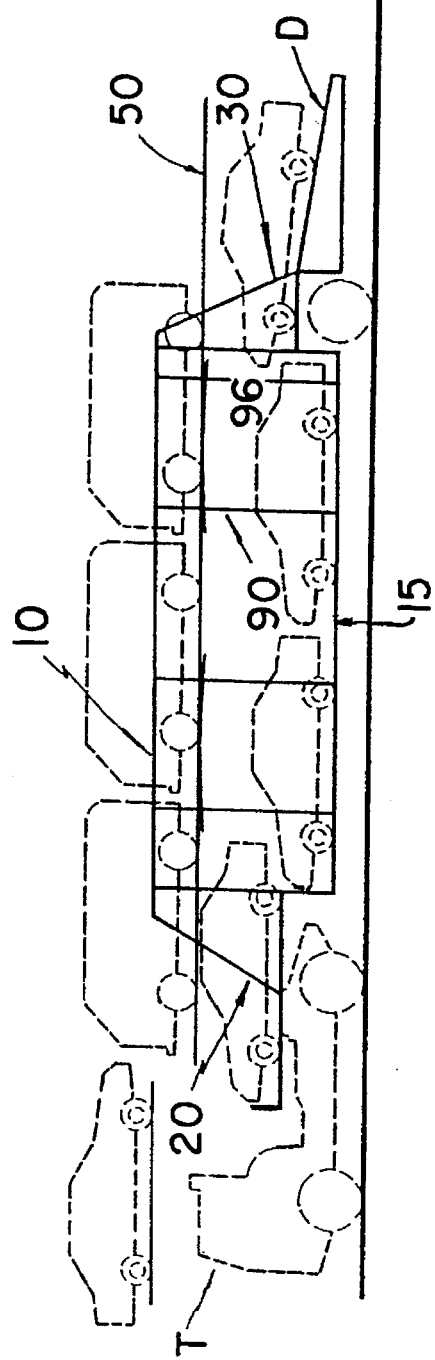

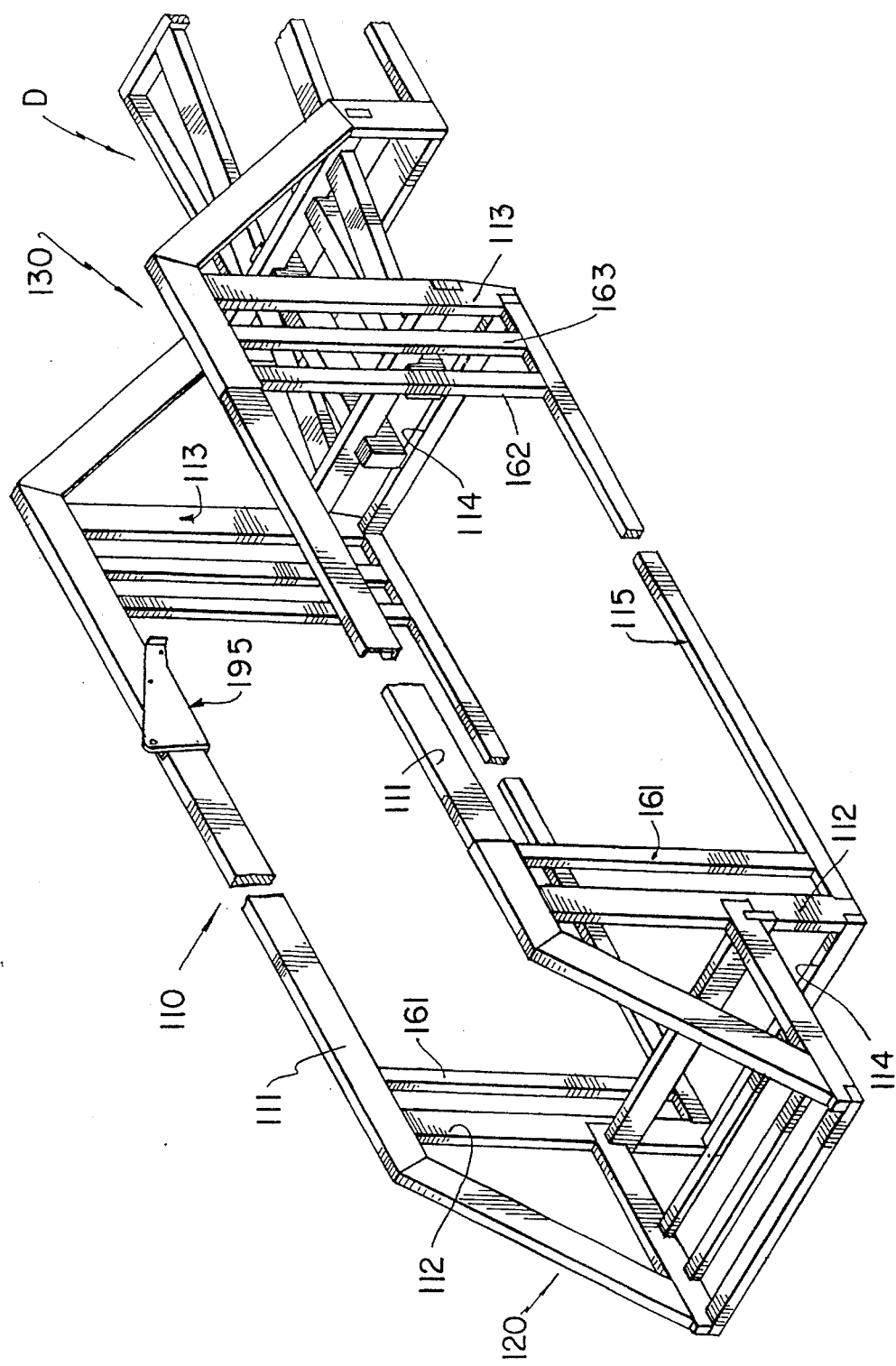

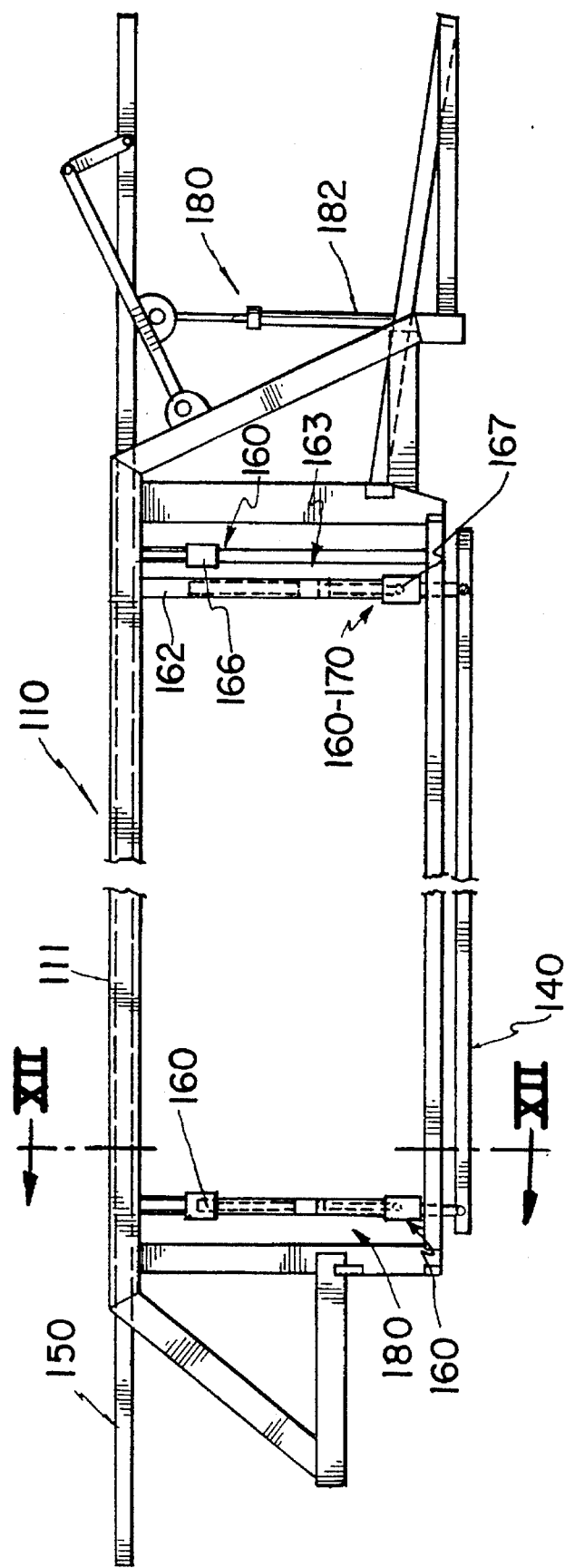

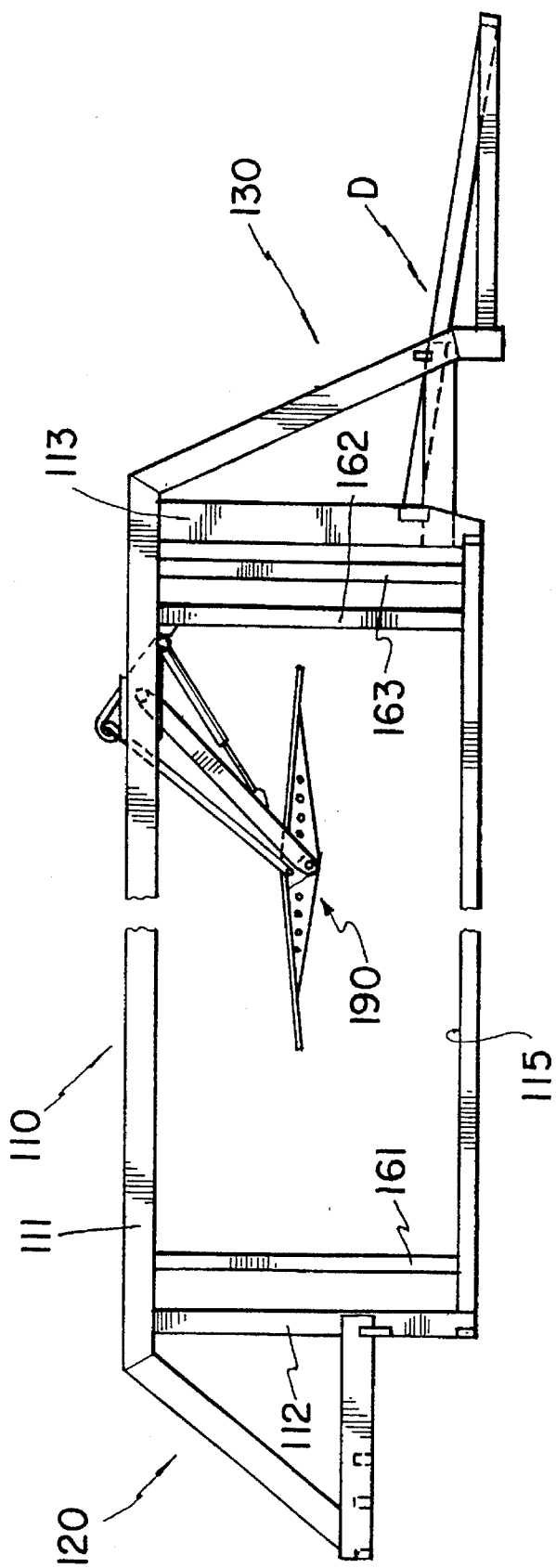

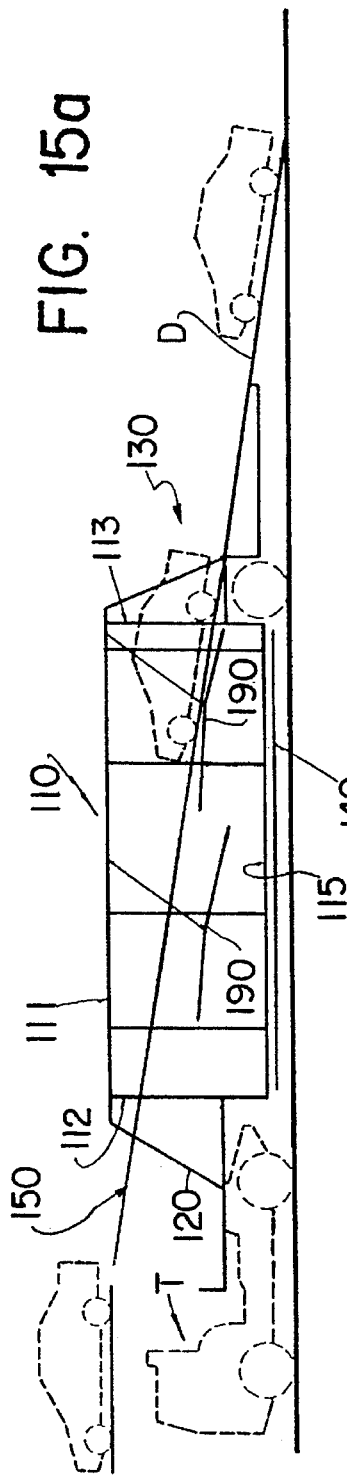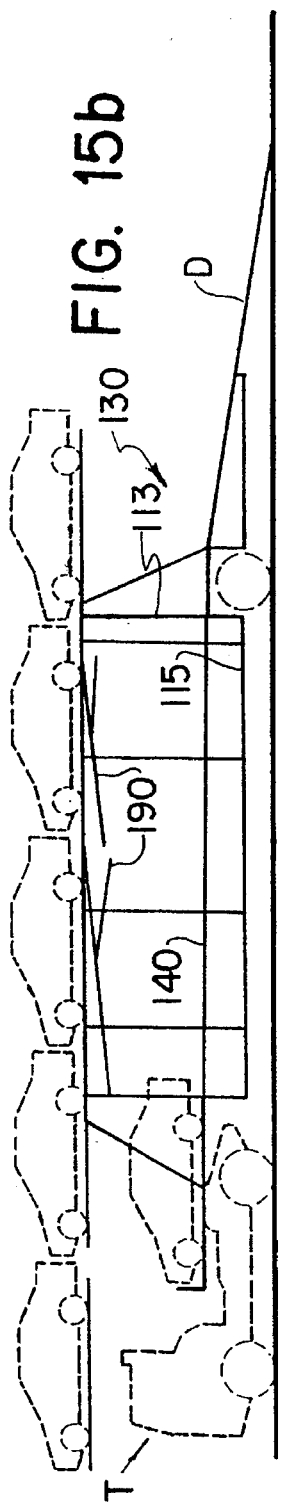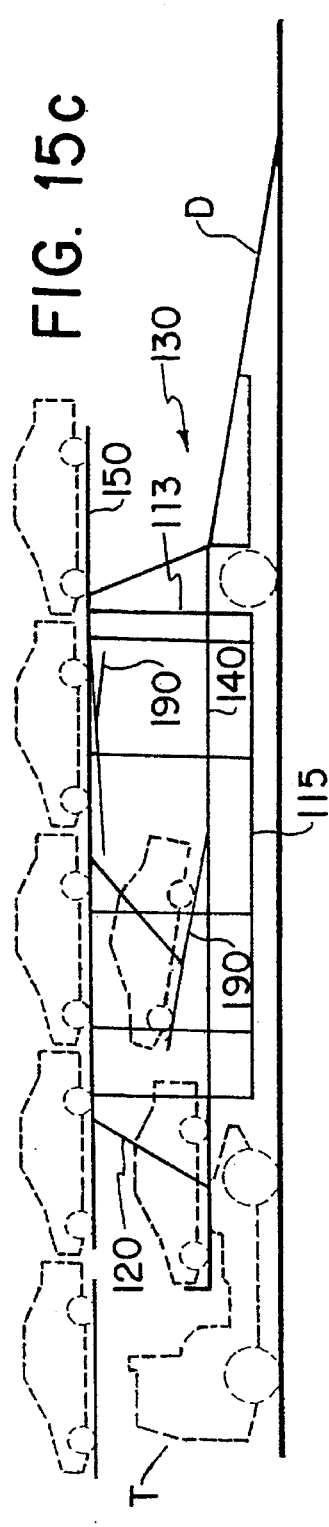

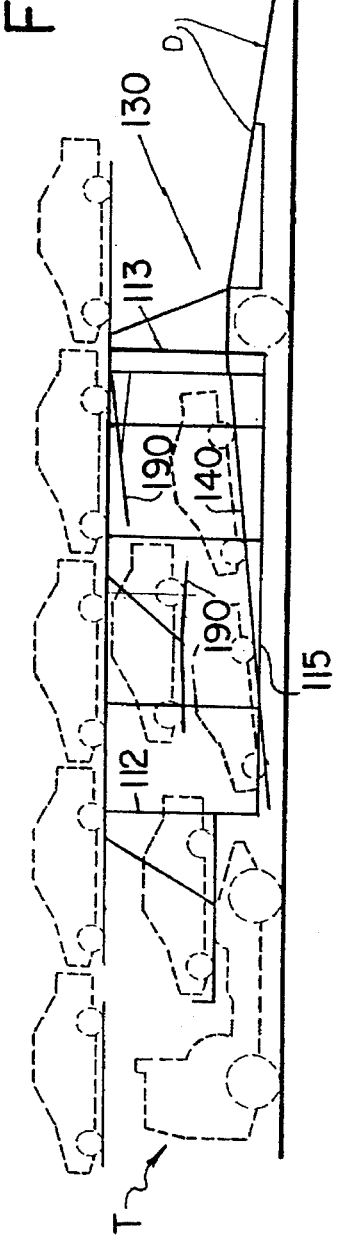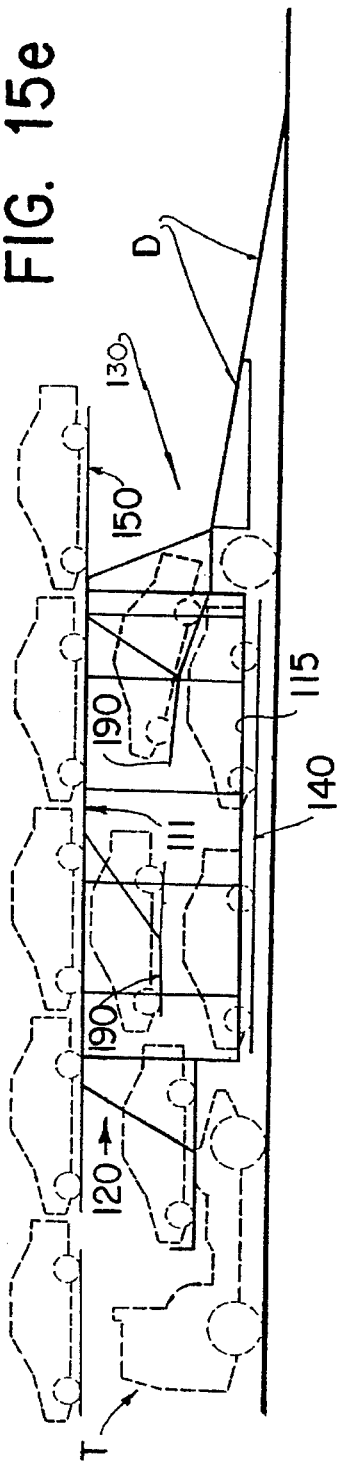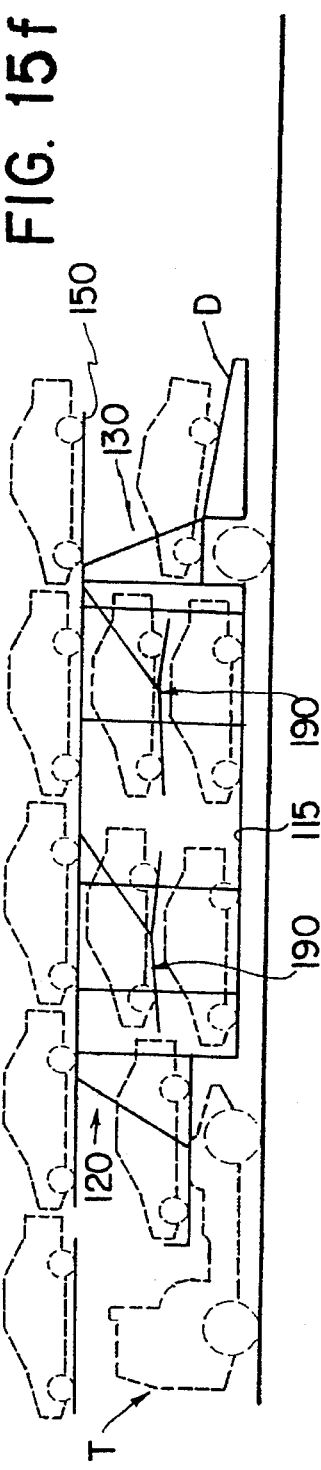

5,527,138

SEMI-TRAILER FOR AUTOMOTIVE VEHICLE TRANSPORTATION

TECHNICAL FIELD

The present invention refers to a low production cost semi-trailer for automotive vehicle transportation, presenting superior load capacity and flexibility, resulting from permitting height adjustments of the trailer's upper and lower platforms. The semi-trailer further permits the transportation of non-vehicular cargoes complying with national and international regulation concerning height, length and maximum weight per trip permitted for such compositions at full load. The semi-trailer also provides a high degree of mobility and operationability when handling a new generation of automobiles being developed by the industry, having lower ground clearances, longer wheelbases, lower spoilers, as well as longer rear projections. For these types of vehicles the semi-trailer has less inclined access and circulation means i.e. lower entry and exit angles.

BACKGROUND OF THE INVENTION

The semi-trailers available for automotive vehicle transportation used for under-developed highways, present complex monobloc constructions, requiring about twenty different types of metallic profiles. Such structures comprise: a fixed lower structural platform provided with parallel longitudinal rails on which the vehicle being transported rolls, which are vertically displaceable in at least two portions in order to provide access to two levels of the trailer. Such semi-trailers have side structures of rigid lattice work between columns. There also is an upper platform, comprising two longitudinal rails supported by crossbars with the upper platform's front being pivotable or not on the structure in order to permit a selective vertical angular displacement of its rear portion for loading and unloading operations maintaining, however, its cruising height constant.

Access to the above-described semi-trailer is effected by its rear end, by means of rails fittable to the lower platform rails which are rearwardly slidable and rest on the ground to provide an access ramp.

Apart from requiring a great number of manual operations for loading and unloading, thereby demanding considerable operation time and physical effort from the operator, the existing constructions have serious technical limitations which altogether considerably limit their mobility and versatility, such as:

the trailer structures are usually over-dimensioned, excessively rigid and, due to the trailer usually using low-course suspensions, vibrations due to highway unevenness are transmitted to the structure, subjecting it to frequent fractures due to material fatigue;

the lower platform permits only limited motion making it difficult to overcome the trailer's wheel box and turntable, resulting in very steep access slopes, especially hindering the maneuverability of low ground-clearance vehicles. Such a construction requires the lowering of the lower platform between the wheel boxes and the front columns of the semi-trailer, forming a so-called "bore", thereby increasing difficulty in accessibility and usually limiting the trailer to transporting only small vehicles;

the upper platform is normally fixed, limiting due to maximum legally permitted cruise heights, the models of vehicles it can carry, generally up to five automobiles, except for light commercial vehicles since these have excessive height. This further limits the space available between platforms, apart from providing excessively steep inclination to the loading/unloading ramp;

the lattice work hinders the full opening of the doors of the vehicles loaded on the lower platform, hence frequently causing damage to the driver's door during its opening for maneuvering of the loaded vehicle;

due to difficulties in accommodating its cargos, the existing semi-trailers have essentially non-homogeneous weight distribution, thereby subjecting their structure and wheel train shaft to additional stressses, increasing maintenance problems thus reducing considerably the durability of the semi-trailer.

Due to the existence of the "bore", to permit access of a vehicle to the berth provided over the tractor's turntable, as well as to optimize its load capacity, which usually is a maximum of eleven automobiles, including in some embodiments a vehicle transported on a structure provided over the tractor, the semitrailer is usually provided with two remount platforms. These platforms are mounted cross-wise on the side columns of said semitrailer, with the remount platforms being vertically displaceable between a lower loading position and an upper non-operative position. Each remount platform carries a vehicle partially superposed or "inserted" between an automobile in the "bore" and the upper platform. This type of embodiment presents a shortcoming due to problems in the remount platform locking means. Due to vibrations from the highway, and consequent shaking of the remount platforms, damages occur due to impacts between remounted vehicles and those traveling in the "bore".

Over the course of time, industry in countries such as Brazil has adopted numerous alterations for semi-trailers for automotive vehicle transportation, envisaging solving the main above-mentioned problems, as well as other less important ones.

Solutions were experimented with, such as using two two-wheel trains, instead of the traditional single four-wheel train in order to obtain a larger track. This permitted lowering the semi-trailer's lower platform, hence eliminating the "bore". While this structure provides highly increased mobility and versatility to the semi-trailer, it gives rise to stability problems and risk of accident in situations such as, for example, when a tire fails.

Most of the solutions adopted to date envisage other structurally and operationally optimizing vehicle-carrying semi-trailers. These also have turned out to be ineffective occasionally solving specific problems but having other limitations.

Semi-trailers use in countries with developed road systems have highly articulated constructions, individually operable upper platforms, soft suspensions and minimal ground clearances (of up to 10 cm.), and in general are fully hydraulically and/or pneumatically actuated. Such constructions are also inadequate for third world conditions, due to their high costs (up to five times higher than locally built semi-trailers).

OBJECTS OF THE INVENTION

Therefore, it is an object of the present invention to provide a low-cost and simple to build semi-trailer for automotive vehicle transportation having high load capacity and operational flexibility as well as high structural resistance and great durability, adequate for operation under poor road conditions.

It is also an object of the invention to provide a semitrailer for automotive vehicle transportation having a high degree of mobility and versatility, which also is adequate for the transportation of late generation vehicles.

It is a further object to provide a semi-trailer for automotive vehicle transportation which provides safe loading/unloading and highway transportation operations and is capable of meeting national and international regulations pertaining to maximum dimensions acceptable for such transporters.

An additional object of the present invention is to provide a semi-trailer for automotive vehicle transportation which carries a single structure that permits obtaining several operational configurations for specific uses, and further permitting the inclusions of a remount platform system which is displaceable and operable in several positions along its course.

It is still another object of the present invention to provide a semi-trailer for automotive vehicle transportation that will permit the transportation of non-vehicular cargos.

DISCLOSURE OF THE INVENTION

These and further objects and advantages of the present invention are achieved by the provision of a semi-trailer for automotive vehicle transportation of the type which is to be coupled to a tractor and rests on at least one tractor wheel train shaft. The semi-trailer has a substantially parallelepipedal basic structure, incorporating a front cargo platform over the trailer's turntable and a rear cargo platform over said wheel train. It also includes at least one lower cargo platform and at least one upper cargo platform, the latter being provided at its rear extreme portion with vertical motion in order to be lowered or lifted at different angles. The upper longitudinal edges of the parallelepipedal basic structure are defined by longitudinal support bars, the extreme vertical edges of said basic structure being defined, respectively, by front side columns, a median region from which projects a front cargo platform, and rear side columns from a median region of which projects a rear cargo platform. The basic structure further incorporates wind-bracing crossbars which unite portions of the lower front and rear columns and the front and rear platforms. The lower and upper cargo platforms are mounted internally to the front and rear lateral columns, with the extreme portions of the lower and upper cargo platforms being selectively vertically displaceable. Platform guide means are mounted on the basic structure laterally to the lower and upper platforms in order to hinder undesirable longitudinal and/or lateral movements of the lower and upper platforms. Lower and upper platform lifting means are mounted on the basic structure adjacent to the platform guide means in order to provide selective vertical movement for the lower and upper platforms.

The present invention also relates to a semi-trailer for automotive vehicle transportation which is simply and cheaply built using a minimal number of different types of profiles. The semitrailer permits height adjustments of both the upper and lower platforms, provides to the operator a high operational flexibility, permits the loading of different types of automobiles together with light commercial vehicles, these being shipped simultaneously on both platforms, without infringing maximum permitted dimension limits. The semi-trailer also provides an optimal weight distribution with a high degree of flexibility.

The bridgelike structure of the invention provides good driving characteristics in highway traffic since it assures permanent contact of the wheels with the ground, this preventing bouncing since the structure absorbs substantially all vibration and impact caused by pavement unevenness.

Further, due to the bridgelike structure the semi-trailer presents "clean" sides or, in other words, due to not carrying the usual lattice work, provides a working cell highly favorable for loading and unloading non-vehicular cargos, mechanically or not, even when voluminous.

The semi-trailer is also adequate for the new generation of cars now being traded, characterized by vehicles "nearer to the ground", hence requiring extremely low-inclination access and circulation ramps.

BRIEF DESCRIPTION OF THE DRAWINGS

The invention will now be described with reference to the attached drawings, wherein:

FIGS. 6A to 6F are side schematic views of the operational steps for loading the upper and lower platforms of the structure and the remount cargo platforms when associated with the transportation of passenger cars;

FIGS. 7A and 7B are similar views to those of FIGS. 6A to 6F, comparatively illustrating the state of the art and the invention when associated with the transportation of utility vehicles;

FIGS. 8A and 8B are similar views to those in FIGS. 7A and 7B, comparatively illustrating the state of the art and the invention when associated with passenger cars being transported together with utility vehicles;

FIG. 9 is a partial section fore-lateral perspective view of the basic structure of the semi-trailer according to an alternative embodiment;

FIG. 10 is a side elevational view of the same basic structure illustrated in FIG. 9 showing the lower and upper platforms and, further, their lifting means;

FIG. 11 is a similar view to that of FIG. 10 illustrating a remount assembly and its cargo platform lifting means;

FIGS. 15a to 15f are schematic side views of the operational sequence for loading the upper and lower cargo platforms when associated with the transportation of passenger cars, according to an alternative embodiment of the remount system.

DETAILED DESCRIPTION OF THE INVENTION

Figure 1:
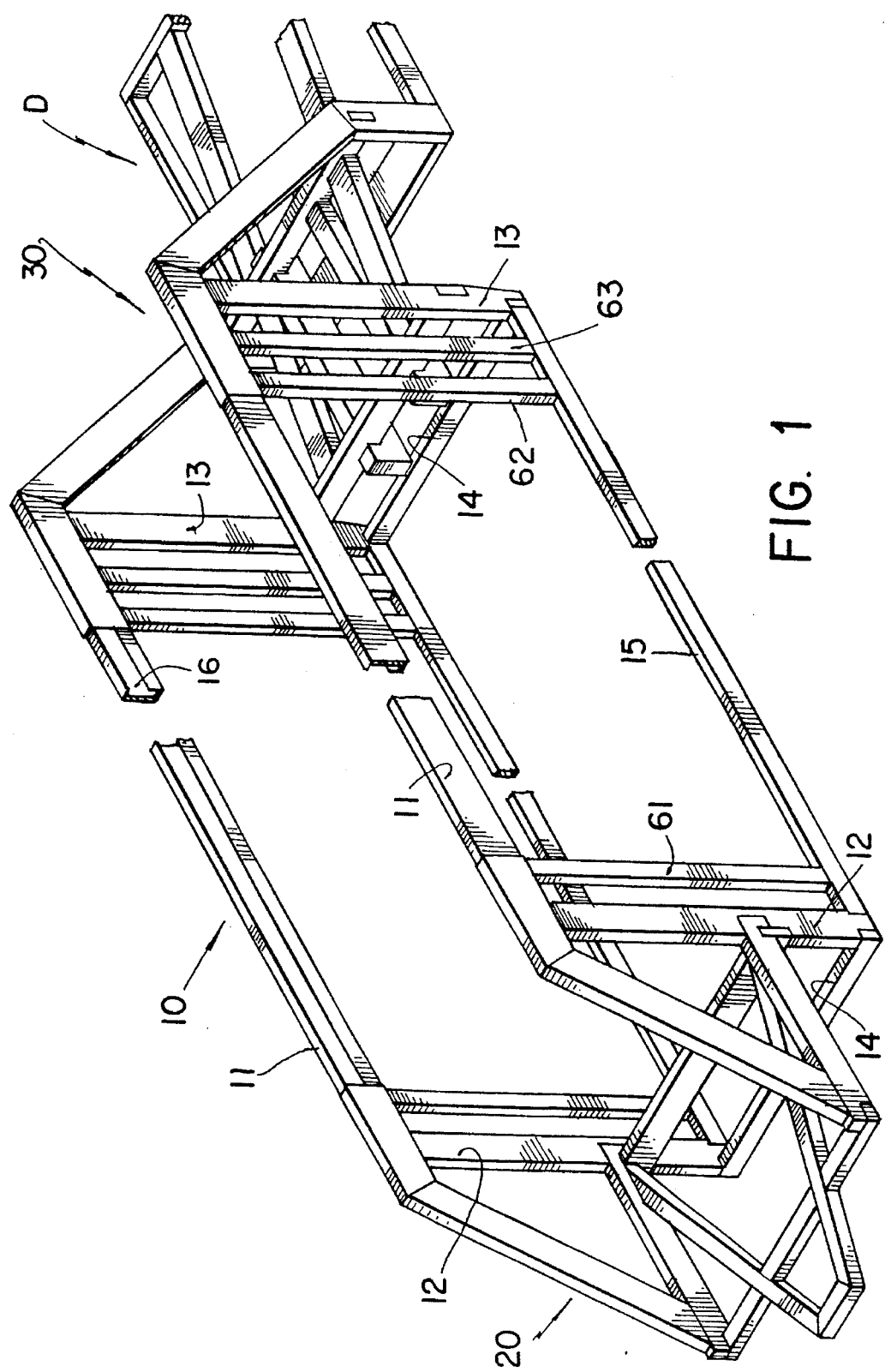
FIG. 1 represents a partially cut fore-lateral perspective view of the basic structure of the semi-trailer.
Figure 2:
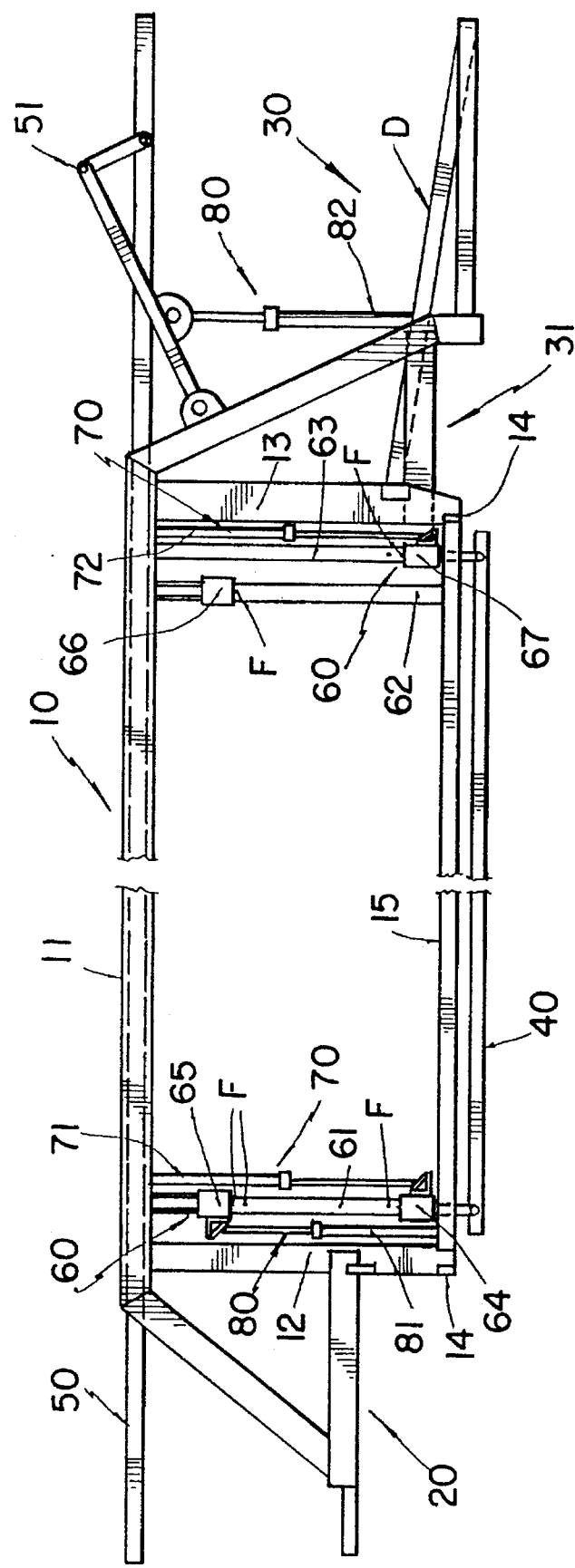
FIG. 2 represents a side elevational view of the same basic structure illustrated in FIG. 1 showing the lower and upper platforms and the lifting means of the latter.

According to FIGS. 1 through 8B, the semi-trailer for automotive vehicle transportation is of the type to be coupled to the turntable of a tractor T (FIG. 6). The semi-trailer rear is supported on a wheel train axle and has a basic structure 10 which is substantially parallelepiped. The structure has upper longitudinal edges defined by longitudinal support bars 11 in a generally "G" shaped metallic profile having an internal channel 16. The openings of the longitudinal support bars 11 are turned inwards to the structure. The structure vertical edges are defined by, respectively, front columns 12 and rear columns 13 whose lower ends are connected by wind-bracing crossbars 14, preferably made out of quadrangular cross-section metallic tubular profiles.

The arch-like shaped configuration apart from permitting the liberation of the interior portion between the turntable of tractor T and the wheel train shaft of the semi-trailer, that is to say, the "bore", gives a considerably increased mobility to the assembly. It permits the provision of a remount platform system 90 (FIG. 3) which is longitudinally displaceable along the "bore", as described below. Remount longitudinal guide bars 15 define the longitudinal lower edges of parallelepipedal basic structure 10.

Structure 10 incorporates a front cargo platform 20, substantially horizontal, fixed above the longitudinal support bars 11 and medianly to front columns 12. The semi-trailer is coupled to the turntable of tractor T below platform 20 which further provides a berth over the turntable of tractor T for transporting one vehicle.

Structure 10 has a rear cargo platform 30 connected above longitudinal support bars 11 and medianly to rear columns 13. Platform 30 provides on the top a berth for transporting a vehicle and below a wheel box 31 housing the semi-trailer's wheel train shaft.

To the rear and below rear cargo platform 30, there is a discharge drawer D, preferably built in two stages in order to provide an access ramp to rear cargo platform 30 of the semitrailer with a minimum slope, and being retractable by sliding the second stage back over the first stage. This assembly is housed in the space between the rear cargo platform 30 and the rear fender of the semi-trailer.

The lower and upper faces of parallelepipedal basic structure 10 define lower cargo platform 40 and upper cargo platform 50. These are built in single pieces, preferably with quadrangular cross-section metallic tubular profiles. The upper platform 50 is built between longitudinal support bars 11 and the lower platform 40 mounted between the front columns 12 and the rear columns 13. The one-piece construction of platforms 40, 50 provides cost-reduction and a simpler operation. In another embodiment, not illustrated, the upper and lower platforms can be provided in multiple modules.

In order to guide the vertical displacement of lower platform 40 and upper platform 50, a platform guide apparatus 60 is provided. This includes front guide columns 61 adjacent to front columns 12; rear guide columns 62, 63 adjacent to rear columns 13; fore-lower sliding sleeves 64, and fore-upper sliding sleeves 65, mounted around said guide columns 61; aft-upper sliding sleeves 66, mounted around said guide columns 62; and aft-lower sliding sleeves 67 mounted around said guide columns 63. The sliding sleeves 64, 65, 66, 67 are restricted against undesirable lateral or longitudinal movements but have free displacement along their respective guide columns 61, 62, 63. Fore-lower sliding sleeves 64 (FIG. 2) are laterally and forely journaled to lower cargo platform 40 in order to guide the vertical and/or angular displacement of the same. Fore-upper sliding sleeves 65 are laterally and forely journaled to upper cargo platform 50 in order to guide the vertical and/or angular displacement of the same. Aft-upper sliding sleeves 66 are laterally and aftly journaled to said upper cargo platform 50 in order to guide the rear vertical and/or angular displacement of the same. Aft-lower sliding sleeves 67 are laterally and aftly journaled to said lower cargo platform 40 in order to guide the rear vertical and/or angular displacement of the same.

In order to lock lower platform 40 and upper platform 50 in pre-determined positions during trailer motion, there are included platform locking means defined by a plurality of bores F provided along each guide column 61, 62, 63. Each bore F selectively houses a locking pin which, when inserted in a position under corresponding sliding sleeve 64, 65, 66, 67, retains the same against its displacement along the respective guide column 61, 62, 63, thus locking the respective platform.

Lower cargo platform 40 is displaceable (see FIG. 6) by lower platform lifting means 70, including lower platform lifting pistons 71, 72 fixed to longitudinal support bars 11, and are hydraulically or pneumatically actuated. Lower platform lifting pistons 71 have their stems coupled to fore-lower sliding sleeves 64 which actuate the front of the lower platform displacing it between an extreme upper position leveling it with the front platform 20, and an extreme lower position near the ground. The other lower platform lifting pistons 72 have their stems coupled to post-lower sliding sleeves 67 which actuate the rear of the platform, displacing it between an extreme upper position leveling it with wheel box 31 and an extreme lower position near the ground.

Upper cargo platform 50 is vertically displaceable by means of upper platform lifting apparatus 80, including upper platform lifting pistons 81, 82, hydraulically or pneumatically actuated. Upper platform lifting pistons 81, fixed to the lower portions of respective front columns 12 or to remount longitudinal guide bars 15, have their stems coupled to sleeves 65 and actuate the front of the platform, displacing it between an extreme upper position elevated over longitudinal support bars 11, and an extreme lower position halfway down front lateral columns 12. Upper platform lifting pistons 82 are fixed, rearly, to rear cargo platform 30 with their stems coupled to the rear portion of upper cargo platform 50 by arms 51 articulated to the upper cargo platform 50 and a portion of the superstructure of rear cargo platform 30. This permits the displacement of the rear portion of upper platform 50 between an extreme upper position leveling with the upper extreme position of the front portion of the platform 50, and an extreme lower position resting against a discharge drawer D, defining an access ramp for vehicles to the upper platform 50.

Upper cargo platform 50 frontly disposed in its normal traveling position and rearly in its extreme lower position, defines an access ramp to the berth provided over the cabin of tractor T, thus providing for transporting a further vehicle.

Remount system 90 (FIG. 3) usable in conjunction with the structure of the present invention, includes at least one, and preferably two, remount trolleys 91, displaceable along the "bore" of the semi-trailer. Each remount trolley 91 has a substantially parallelepipedal shape. Its longer edges, substantially vertical, are defined by remount columns 92, which are preferably made of "U"-shaped cross-section metallic profiles, whose openings confront each other, defining remount guides 93, the function of which is described below. The remount columns 92 are connected by respective lower remount locks 94 and upper remount locks 95 in order to provide longitudinal wind-bracing for the remount trolley 91.

Vertically displaceable along each remount trolley 91, there is provided a remount platform 96 defined by two cross bars 96a, preferably made of metallic tubular profiles, disposed between respective confronting remount guides 93, and carrying two longitudinal rails for vehicle rolling. Remount trolleys 91 are suspended by rollers 97 journaled to the upper ends of respective remount columns 92 and housed in the channels 16 of longitudinal support bars 11, along which they are displaceable. In order to guide the lower ends of the remount trolleys 91 during their displacement, there is provided at the lower end of each remount column 92, a respective remount guide fork 98. Fork 98 is a substantially inverted "U"-shaped structure fitted into the top of remount longitudinal guide bar 15 along which it is displaceable. The rollers 97 guided in channel 16 of the longitudinal support bars 11 and the remount guide forks 98, guided by the remount longitudinal guide bars 15, further provide lateral wind-bracing to said remount trolley 91.

Remount trolley 91, built according to the description above, is easily slidable, requiring for its displacement a minimal effort. In order to lock it against involuntary displacements, each said remount trolley 91 is provided with a braking device 99, preferably actuated by friction on one of the remount longitudinal guide bars, therefore being disposed in a lower and adjacent portion of one of its remount columns 92.

In order to assure safe operation, braking device 99 has a blocked resting position, which means that remount trolley 91 is only displaceable in the operator-actuated condition of said braking device 99.

The present embodiment including remount trolleys 91, as can be observed, provides considerable versatility to the semitrailer of the present invention. It permits numerous traveling positions, permits a large number of cargo combinations, and handling of various models of vehicles. In another embodiment, not illustrated, instead of two remount trolleys, the remount system can comprise three adequately disposed remount modules with only one degree of freedom, that is to say, provided with only vertical motion. This embodiment provides a somewhat reduced versatility to the semi-trailer.

Figure 3:
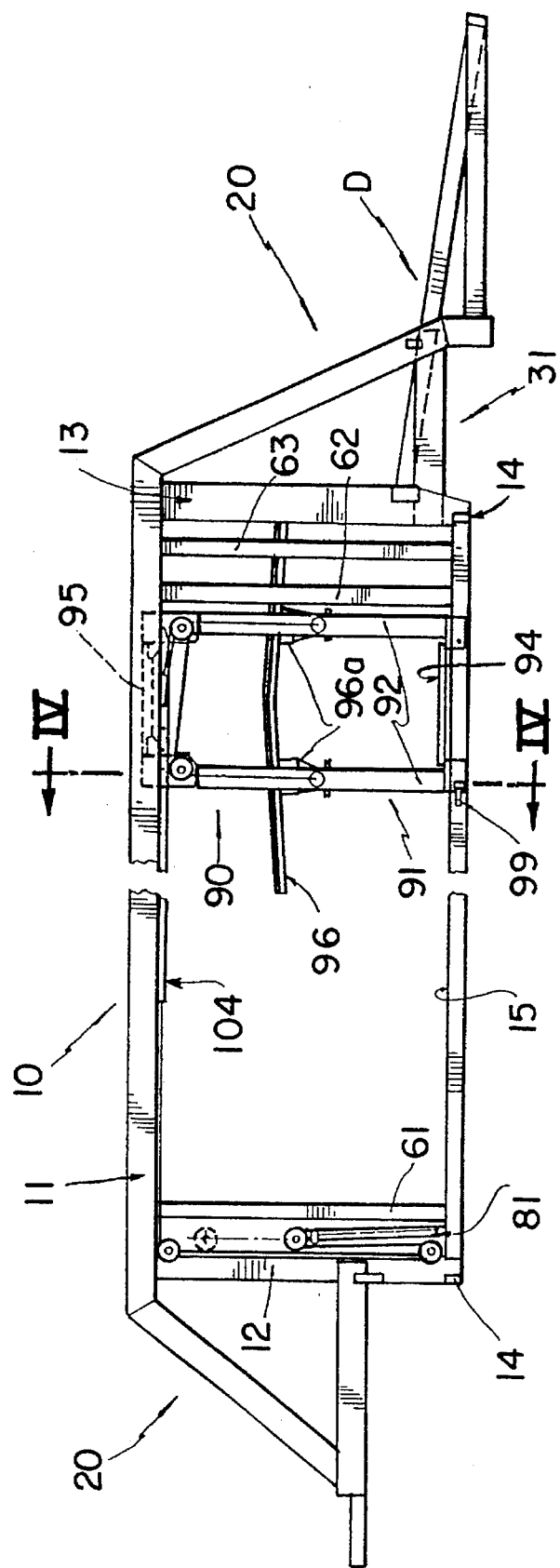
FIG. 3 represents a similar view to that of FIG. 2 illustrating a remount assembly and the listing means for its cargo platform.
Figure 4:
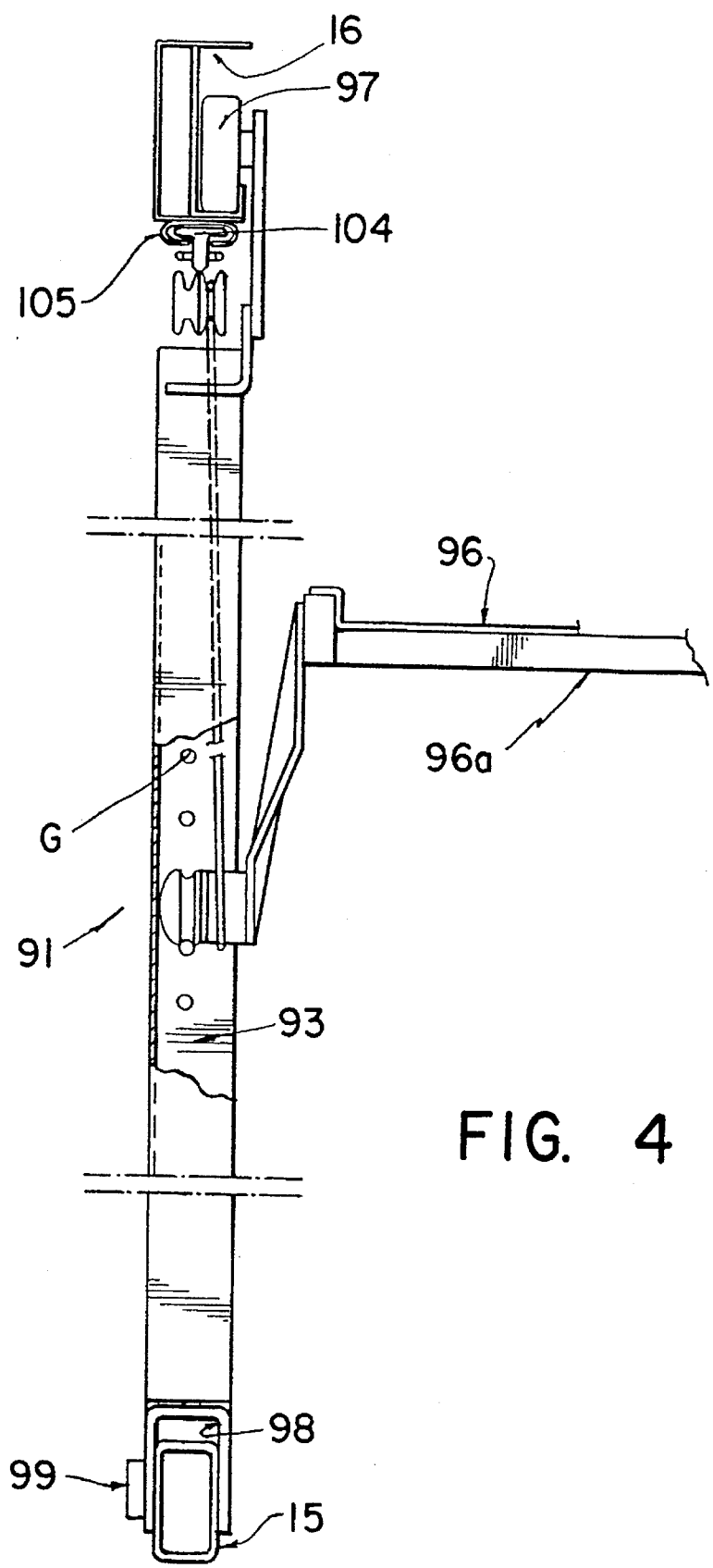
FIG. 4 is an enlarged crosscut view taken along line IV—IV in FIG. 3.
Figure 5:
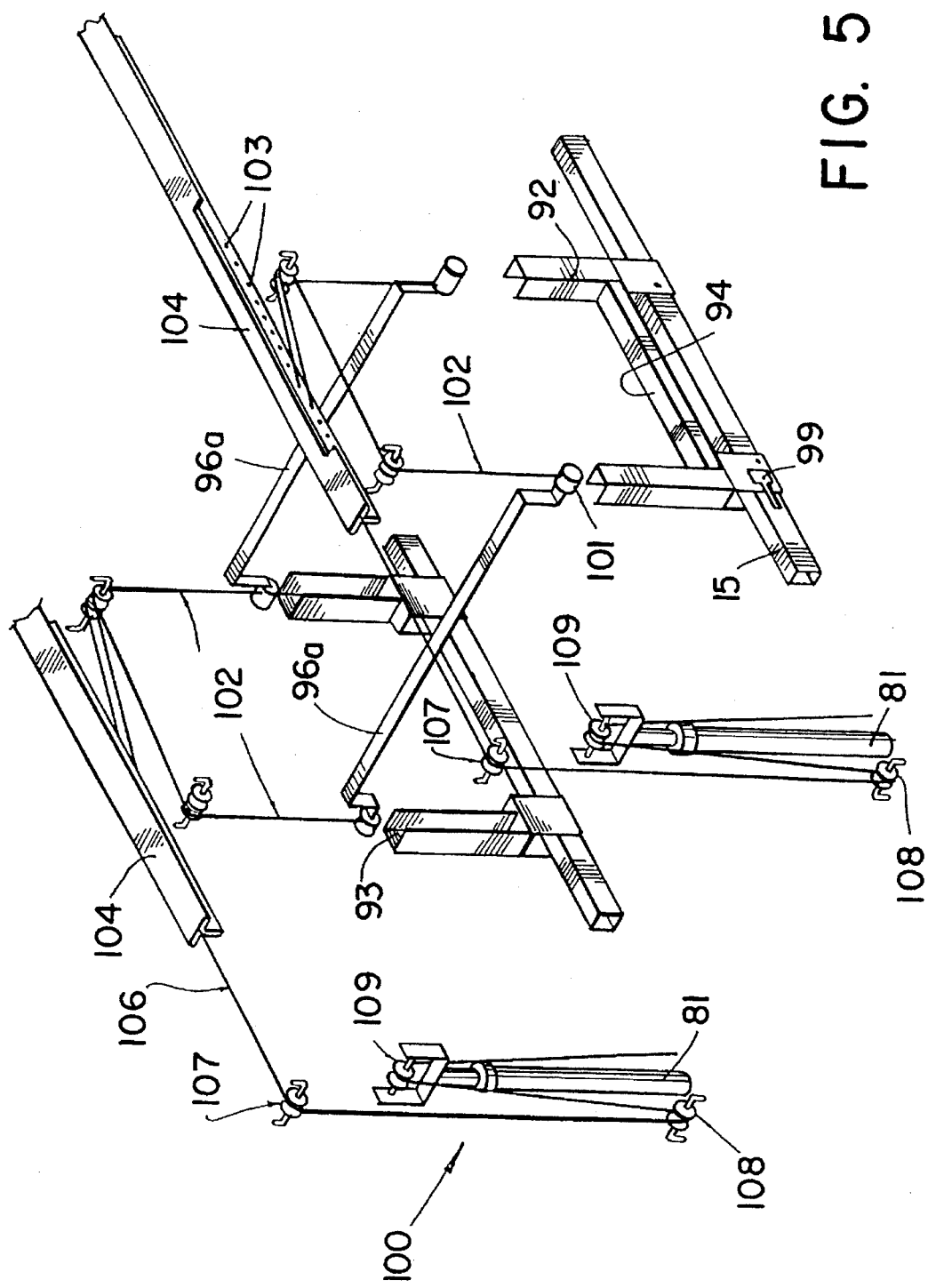
FIG. 5 is a fore-lateral schematic perspective view of a remount assembly and of the respective lifting means of its cargo platform.
Figure 12:
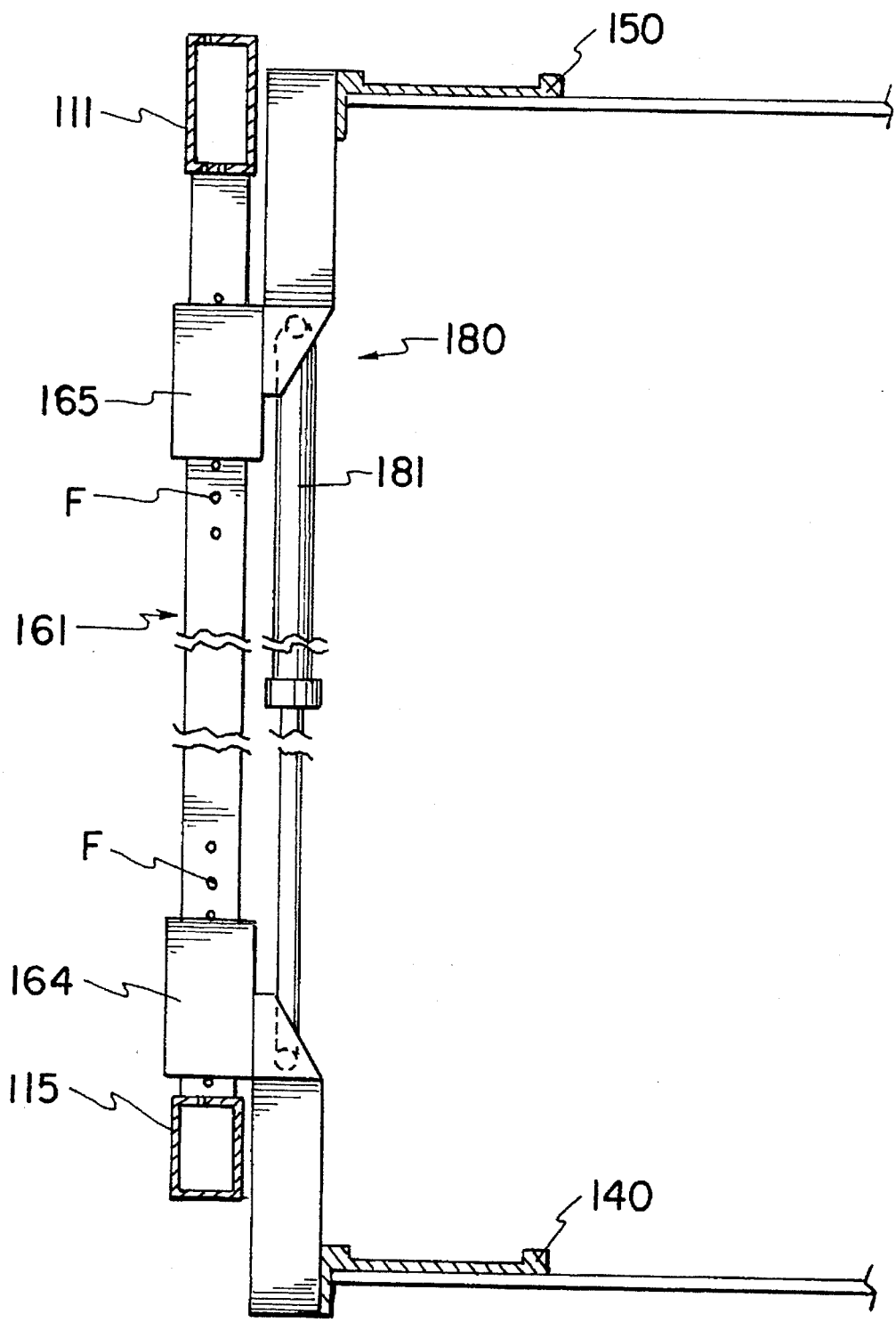
FIG. 12 represents an enlarged cross-sectional view taken along line XII—XII in FIG. 10.
Figure 13:
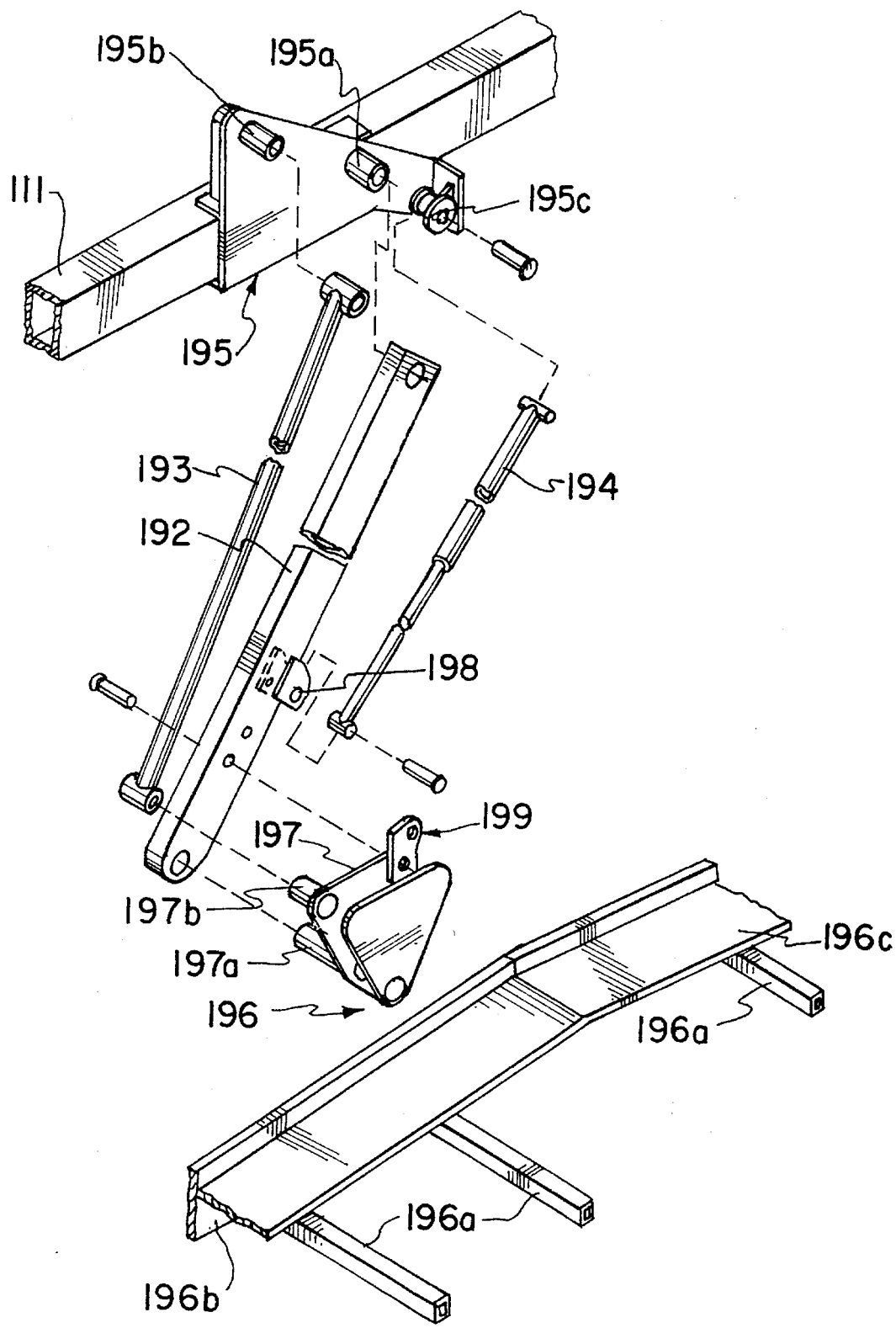
FIG. 13 is an exploded fore-lateral perspective view of the lifting means of the cargo platform of the remount assembly.
Figure 14:
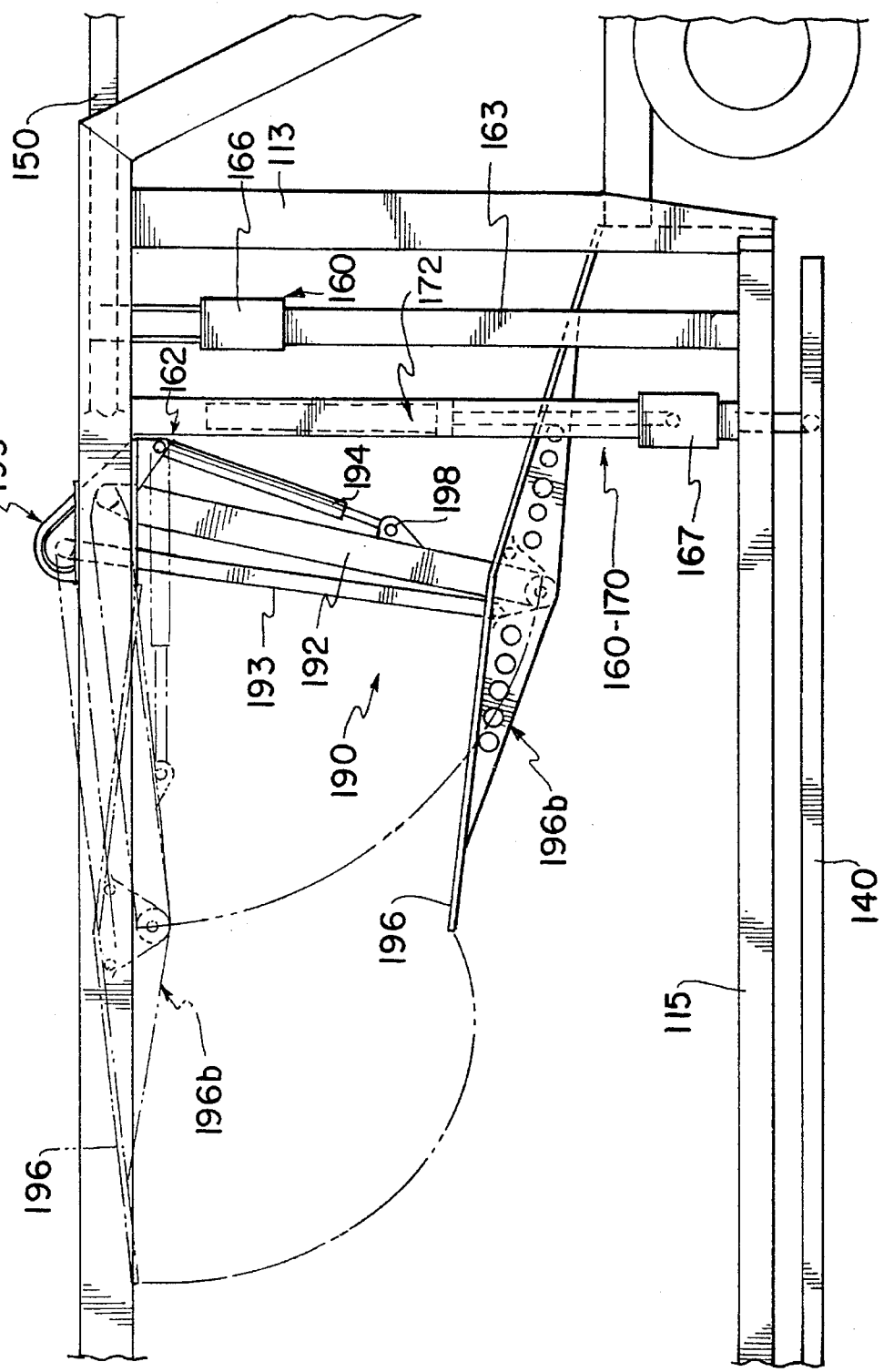
FIG. 14 is a view similar to that of FIG. 11, illustrating rear extreme partially cut and enlarged, showing the remount platform in its loading position in full lines and in its retracted position.

As can be seen in FIGS. 3, 4 and 5, each remount 96 can be selectively displaced vertically by the operator of the vehicle in order to be leveled with front cargo platform 20 or rear cargo platform 30, or resting on lower cargo platform 40. Further, it can be lifted until touching below upper cargo platform 50, therefore providing a remount lifting system 100 which will be described below.

Each remount platform 96 carries four guide rollers 101 positioned at the ends of cross bars 96a and fitted into respective remount guides 93, each being defined on the respective remount column 92.

For the lifting or lowering of remount platform 96, there is provided at each end of the remount cross bar 96a a corresponding guide roller 101. One end of a respective lifting cable 102, there being a pair of cables 102, is disposed on a side of the vehicle, and has its opposite end connected to remount platform 96 and is selectively engageable along retention means defined by bores 103 disposed along a certain extension of a respective rigid rod 104 axially slidable along guide means 105 disposed under the respective longitudinal support bar 11 of basic structure 10. The rigid rod 104 has its front end fixed to a second cable 106 disposed so as to pass around a fore-upper pulley 107 and a fore-lower pulley, disposed on a same side of basic structure 10. Cable 106 further extends around a movable pulley 109 removably and alternately coupleable to a fore-upper sliding sleeve 65 at the upper end of the stem of upper platform lifting piston 81, this being the final extreme of this second cable 106 which can be fixed to any point under basic structure 10, in order that, when the stem of lifting piston 81 is uncoupled from the respective fore-upper sliding sleeve 65, the actuation of said lifting piston provokes the actuation of its mobile pulley 109 over second cable 106 tractioning or liberating the rigid rod 104 on the same side of basic structure 10 to move in one or the other direction. This pulls the respective pair of first cables 102 on the side of the column, thereby promoting the lifting or lowering of that side of remount platform 96 along the respective remount columns 92.

Lifting and lowering operations are effected through a pre-positioning of the respective lifting piston 81 in a position in which the next operation, being it the lowering or lifting of the piston stem, produces a movement of second cable 106 corresponding to the desired operation of lifting or lowering said remount platform 96.

The relationship between the movement of the stems of the upper platform lifting pistons 81 and the total vertical displacement of remount platform 96 is not one-to-one. To obtain a total vertical displacement of each remount platform 96 in the upwards or downwards direction, a single displacement of the stems of lifting pistons 81 in the same direction is necessary.

For traveling there are further provided remount locking means, defined by a plurality of bores G, provided along remount columns 92. Each bore selectively houses a locking pin below the respective guide roller 101 in order to retain the latter against its displacement along the remount column 92, thereby locking the remount platform 96.

In the present embodiment, the same pistons usable to displace the front of upper cargo platform 50 actuate remount platforms 96 for lifting and lowering. This arrangement is an important factor for lowering the production cost of the semitrailer. In another embodiment, not illustrated, the remount platforms can be actuated by displacement of independent mechanical hydraulic, or pneumatic motor means or a combination thereof. This obtains the same operational result but at a substantially higher cost.

The alternative embodiment of the invention, illustrated in FIGS. 9 to 15f, will be described with reference to its elements differing from the embodiment according to FIGS. 1 to 8b using the same reference numbers preceded by the digit 1. This embodiment has a basic structure 110, platform guide means 160, platform lifting means 170, 180 and a remount system 190 substantially the same as corresponding elements 10, 60, 70, 80 and 90 of the previously defined embodiment. In this embodiment, basic structure 110, shaped substantially like basic structure 10, has longitudinal support bars 111 built out of a closed quadrangular cross-section metallic profile. This simplification is possible because the remount system 190 does not include any element displaceable along longitudinal support bars 111, as will become evident.

Platform guide means 160 has post-upper sliding sleeves 166 mounted around guide columns 163, whereas post-lower sliding sleeves 167 are mounted around guide columns 162.

The front lifting actuation of both lower cargo platform 140 and upper cargo platform 150 is simplified. It includes a single platform lifting piston 181 disposed adjacent to each front guide column 161 which means that lower platform lifting pistons 71 of the embodiment illustrated in FIGS. 1 to 8B are eliminated. Therefore, each platform lifting piston 181 is coupled to a corresponding fore-lower sliding guide sleeve 164, its stem being coupled to fore-upper sliding guide sleeve 165, or vice-versa. Selective displacement of lower cargo platform or upper cargo platform 150 is achieved through locking upper platform 150 and freeing lower platform 140, or by freeing upper platform 150 and locking lower platform 140, respectively, followed by actuation of platform lifting pistons 181.

Actuation-locking of upper cargo platform 150 is provided by inserting a locking pin into bore F disposed on front guide column 161 immediately below said upper cargo platform 150. To actuation-lock lower cargo platform 140, the locking pin is inserted in bore F immediately over the lower cargo platform 140.

For better arrangement, lower and upper platform lifting pistons 181 and lower platform lifting pistons 172 are mounted adjacent to the internal faces of guide columns 161 and 162, respectively.

Remount system 190 includes at least one, and preferably two, remount platform 196, each comprising at least two cross-bars 196a disposed in between respective longitudinal remount bars 196b, and supporting a pair of rails 196c to carry vehicles. The remount platform 196 is pivotally suspended from longitudinal support bars 111, through respective suspension means 192, defined by support pendular 192. Platform 196 is displaceable between a loading position adjacent to rear cargo platform 130 in which the rear portion of remount platform 196 defines an access ramp to the remount platform 196 with its front portion assuming a substantially horizontal position, and a retracted position. In the retracted position, the remount platform 196 sits horizontally and against upper cargo platform 150, in response to a pendular movement of support pendula 192, as will be established further on during this description.

Located in front of and cooperating with each support pendulum 192 is a localization positioning arm 193 forming a pantographic assembly. The assembly is disposed so as to provide a quasi-horizontal angular positioning of remount platform 196, between the loading and retracted positions described above. In the rear of each support pendulum 192, there is provided a remount platform lifting piston 194, adequately dimensioned to move a remount platform 196 carrying a vehicle. Said support pendula 192, positioning arms 193 and remount lifting pistons 194 are mounted on top on respective tubular bearings 195a, 195b, 195c, incorporated with an upper bearing support 195, the latter being mounted, for example, secured to the internal face of longitudinal support bar 111. The bottoms of the actuating arms 192 and positioning arms 193 are mounted on respective tubular bearings 197a, 197b, incorporated to a lower bearing support 197, fixed for example by means of screws, to the median portion of the external lateral face of longitudinal remount bar 196b. The stem of remount platform lifting piston 194 is articulately fixed to a piston support 198 provided on the support pendulum 192 adjacent to its lower extreme portion.

It should be noted that the removable fixture of the remount system 190 to basic structure 110, by means of upper bearing supports 195, as well as the upper fixture of remount platform 196, by means of lower bearing supports 197, as described, permits variations in the disposition of said remount platforms 196 along basic structure 110 of the semi-trailer, as well as transferring the whole remount system 190 to another unit. This also makes its disassembly for part replacements or maintenance extremely simple.

Positioning arm 193, whose lower part is articulated in a position to the front of remount platform 196, is disposed relatively to support pendulum 192 in such a way that by the action of remount lifting piston 194, the lower extremity of positioning arm 193 describes a longer angular path than the lower extremity of support pendulum 192. This difference of path described by the front portion of remount platform 196 provides the quasihorizontality of the latter.

For locking during travel of remount platform 196, there is a remount-locking means, defined by at least one bore 199 provided on lower bearing support 197 and a cooperating bore provided on support pendulum 192. The bores, when coincident, hold a respective locking pin.

As can be seen, the proposed semi-trailer thanks to its bridge-shaped structure without the usual lateral latticework structure associated with the alternative remount platform, has the feature of dispensing any kind of vertical sliding guides, such as rails, provides entire access to the semi-trailer's sides. this permits ample loading and unloading space making it adequate for non-vehicular transportation.

We claim:

1. Semi-trailer to be coupled to the turntable of a tractor for automotive vehicle transportation comprising:

a substantially parallelepipedal basic structure having a forward end and a rear end incorporating a front cargo platform at its forward end to extend over the tractor turntable to which the semi-trailer is to be coupled and a rear cargo platform at its rear end to be placed over a wheel train shaft, said basic structure further including between said front and rear platforms a central section having at least one lower cargo platform and at least one upper cargo platform each having a respective front portion and a rear portion respectively facing toward said basic structure forward and rear ends;

means for mounting the rear portion of said upper cargo platform relative to said basic structure to vertically lower and lift said upper cargo platform at different angles relative to the horizontal;

upper and lower longitudinal edges of said central section of said basic parallelepipedal structure having respective spaced apart upper and lower longitudinal support bars, vertical columns fixedly connecting said upper and lower support bars in two substantially parallel planes;

guide means for said lower cargo platform and upper cargo platform mounted on said vertical columns to permit vertical displacement of said lower cargo platform and said upper cargo platform on said columns;

respective upper platform and lower platform lifting means mounted on said basic structure to provide selective vertical movement to move said lower platform between an uppermost position level with said front cargo platform and a lowermost position below said basic structure lower longitudinal support bars adjacent to the ground and to said upper platform to move it between an uppermost position above said basic structure upper longitudinal support bars and a lowermost position substantially half-way down the height of said vertical columns.

2. Semi-trailer according to claim 1, wherein said guide means include: front guide columns mounted on said basic structure adjacent to at least one of said vertical columns and carrying front-lower sliding sleeves and front-upper sliding sleeves; rear guide columns mounted on said basic structure, adjacent to at least one other of said vertical columns and carrying, respectively rear-lower sliding sleeves and rear-upper sliding sleeves;

said front-lower, front-upper, rear-upper and rear-lower sliding sleeves being mounted around and displaceable along respective guide columns, said front-lower sliding sleeves laterally and forely journaling said lower cargo platform, said front-upper sliding sleeves laterally and forely journaling said upper cargo platform, said rear-upper sliding sleeves laterally and rearly journaling said upper cargo platform and said rear-lower sliding sleeves laterally and rearly journaling said lower cargo platform.

3. Semi-trailer, according to claim 2 wherein said lower platform lifting means and said upper platform lifting means comprise, respectively, lower platform lifting piston and upper platform lifting pistons each having first and second ends, said platform lifting pistons having one end coupled to said lower cargo platform, and the other end coupled to said upper cargo platform, and said lower platform lifting pistons and upper platform lifting pistons coupled by one (original) end to said basic structure and by the other end to a respective said lower cargo platform or (original) upper cargo platform.

4. Semi-trailer, according to claim 3 wherein each said lower and upper platform lifting piston has said one end coupled to one of the elements of said front-lower sliding sleeve and front-upper sliding sleeve and its other end coupled to the other of said elements.

5. Semi-trailer according to claim 4, further comprising upper and lower actuation-locking means each having a bore disposed on a front guide column, below a said front-upper sliding sleeve on said front guide column, and another bore disposed on said front guide column, above said front-lower sliding sleeve, each said bore for selectively receiving a locking pin.

6. Semi-trailer, according to claim 1 further comprising at least one cross bar disposed below said forward cargo platform connecting said vertical columns and at least one cross bar disposed below said rear cargo platform connecting said vertical columns.

7. Semi-trailer to be coupled to the turntable of a tractor for automotive vehicle transportation:

a substantially parallelepipedal basic structure having a forward end and a rear end incorporating a front cargo platform at its forward end to extend over the tractor turntable to which the semi-trailer is to be coupled and a rear cargo platform at its rear end to be placed over a wheel train shaft said basic structure further including a central section between said front and rear platforms having at least one lower cargo platform and at least one upper cargo platform each having a respective front portion and a rear portion respectively facing toward said basic structure forward and rear ends;

means for mounting the rear portion of said upper cargo platform relative to said basic structure to vertically lower and lift said upper cargo platform at different angles relative to the horizontal;

upper and lower longitudinal edges of said basic parallelepipedal structure central section having respective spaced apart upper and lower longitudinal support bars, vertical columns fixedly connecting said upper and lower support bars in two substantially parallel planes;

guide means for said lower cargo platform and upper cargo platform mounted on said vertical columns to permit vertical displacement of said lower cargo platform and said upper cargo platform on said columns;

respective lower platform and upper platform lifting means mounted on said basic structure to vertically raise and lower said platforms;

a remount system mounted on said basic structure and including at least one remount platform articulately suspended between upper longitudinal lateral borders of said basic structure by pendular type suspension means, and articulately attached to longitudinal lateral borders by horizontalization means to be longitudinally and vertically displaceable along said basic structure in response to a pendular movement of said suspension means, and a remount lifting piston mounted between said basic structure and said lifting platform.

8. Semi-trailer, according to claim 7, wherein said remount platform comprises at least one cross bar disposed between respective longitudinal remount bars having a profile laterally presenting a substantially angular shape and supporting a pair of rails for vehicle rolling.

9. Semi-trailer, according to claim 8 wherein said suspension means meludes a support pendulum, and localization means including positioning arm having an upper end mounted on respective tubular bearings incorporated to an upper bearing support mounted to said longitudinal lateral borders and, a lower end mounted on respective tubular bearings incorporated to a lower bearing support mounted on a median portion of an external lateral face of a longitudinal remount bar.

10. Semi-trailer, according to claim 7, wherein a rear portion of the remount platform in a loading position, defines an access ramp to said remount platform adjacent to rear cargo platform.

11. Semi-trailer, according to claim 7, further comprising a remount locking means defined by a bore on a lower bearing support coincident with a cooperating bore on said suspension means, said bores for receiving a respective locking pin.

12. Semi-trailer, according to claim 7, wherein said suspension means includes a support pendulum and localization means including a positioning arm having an upper end mounted on respective tubular bearings incorporated to an upper bearing support mounted to said longitudinal lateral borders and, a lower end mounted on respective tubular bearings incorporated to a lower bearing support mounted on a median portion of an external lateral face of a longitudinal remount bar.

13. Semi-trailer according to claim 7, wherein said lower platform and upper platform lifting means mounted on said basic structure provide selective vertical movement to move said lower platform between an uppermost position level with said front cargo platform and a lowermost position below said structure lower longitudinal support bars adjacent to the ground and to said upper platform to move it between an uppermost position above said basic structure upper longitudinal support bars and a lowermost position substantially half-way down the height of said vertical columns.

* * * * *